United States Patent
Mochizuki et al.

(10) Patent No.: US 9,792,944 B2
(45) Date of Patent: *Oct. 17, 2017

(54) RECORDING MATERIAL AND OPTICAL INFORMATION RECORDING MEDIUM

(71) Applicant: FUJIFILM Corporation, Tokyo (JP)

(72) Inventors: Hidehiro Mochizuki, Odawara (JP); Tetsuya Watanabe, Haibara-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/944,345

(22) Filed: Nov. 18, 2015

(65) Prior Publication Data

US 2016/0071538 A1    Mar. 10, 2016

Related U.S. Application Data

(63) Continuation of application No. PCT/JP2014/062599, filed on May 12, 2014.

(30) Foreign Application Priority Data

May 27, 2013 (JP) .................................. 2013-111066

(51) Int. Cl.
  *G11B 7/24* (2013.01)
  *C09B 69/10* (2006.01)
  (Continued)

(52) U.S. Cl.
  CPC .............. *G11B 7/246* (2013.01); *C09B 5/347* (2013.01); *C09B 57/00* (2013.01); *C09B 69/10* (2013.01);
  (Continued)

(58) Field of Classification Search
  None
  See application file for complete search history.

(56) References Cited

U.S. PATENT DOCUMENTS 3,399,173 A * 8/1968 Heller .................. C07D 249/20
  526/259
3,637,581 A * 1/1972 Horiguchi ................ C08F 4/04
  524/804

(Continued)

FOREIGN PATENT DOCUMENTS

CN    1918643 A    2/2007
JP    63-81092 A    4/1988
(Continued)

OTHER PUBLICATIONS

Verbiest et al. "Electrooptic properties of side chain polyimides with exceptional thermal stabilities", Macromol., vol. 28 pp. 3005-3007 (1995).*

(Continued)

*Primary Examiner* — Martin Angebranndt
(74) *Attorney, Agent, or Firm* — Sughrue Mion, PLLC

(57) ABSTRACT

A recording material includes a dye-bonded polymer compound which contains a polymer compound to which a one-photon absorption dye is bonded, and a glass transition temperature of the recording material is higher than 200° C. An optical information recording medium includes a recording layer and an intermediate layer adjacent to the recording layer, and the recording layer contains the above-described recording material.

9 Claims, 5 Drawing Sheets

| | Material of Recording Layer | Absorption maximum wavelength | Evaluation of Recording property (CNR) | Evaluation of Long-term stability | |
|---|---|---|---|---|---|
| | | | | Stability of Intensity of reflected beam reflected at interface (Rate of change) | Stability of Recording mark(s) (Rate of change) [Glass transition temperature] |
| Example 1 | 1-aminobutadiene derivative is bonded to PAcN (Compound G) | 373nm | Good (Not Smaller than 35dB) | Good (Lower than 10%) | Good (Lower than 10%) [200°C or higher] |
| Comparative Example 1 | Benzotriazole derivative is bonded to PBzMA (Compound C-1) | 347nm | Good (Not Smaller than 35dB) | Good (Lower than 10%) | Not Good (100%) [61°C] |
| Comparative Example 2 | Benzotriazole derivative (Compound P-1) is dispersed in PBzMA | 347nm | Good (Not Smaller than 35dB) | Not Good (Not Lower than 35%) | Not Good (100%) [47°C] |
| Comparative Example 3 | Terphenyl derivative is bonded to PMMA (Compound D-1) | 303nm | Not Good (0dB) | Good (Lower than 10%) | Not Good (Not Lower than 30%) [140°C] |
| Comparative Example 4 | 1-aminobutadiene derivative (Compound H) is dispersed in PAcN | 376nm | Good (Not Smaller than 35dB) | Not Good (Not Lower than 50%) | Good (Lower than 10%) [200°C or higher] |

(51) Int. Cl.
    *C09B 5/34* (2006.01)
    *G11B 7/246* (2013.01)
    *G11B 7/24038* (2013.01)
    *G11B 7/245* (2006.01)
    *C09B 57/00* (2006.01)

(52) U.S. Cl.
    CPC .......... *C09B 69/105* (2013.01); *C09B 69/109* (2013.01); *G11B 7/245* (2013.01); *G11B 7/24038* (2013.01)

(56) References Cited

U.S. PATENT DOCUMENTS

| | | | | |
|---|---|---|---|---|
| 4,443,534 | A | * | 4/1984 | Kojima ................... C08F 20/60 430/507 |
| 4,728,724 | A | * | 3/1988 | Jones, Jr. ............... G11B 7/244 346/135.1 |
| 4,861,697 | A | | 8/1989 | Hulme-Lowe et al. |
| 5,084,370 | A | | 1/1992 | Bell et al. |
| 5,124,240 | A | | 6/1992 | Brosius et al. |
| 5,667,860 | A | * | 9/1997 | Burns ................... C09B 69/105 369/283 |
| 6,379,768 | B1 | | 4/2002 | Saito et al. |
| 9,368,144 | B2 | * | 6/2016 | Mochizuki ............. G11B 7/245 |
| 9,406,332 | B2 | * | 8/2016 | Mochizuki ......... G11B 7/24038 |
| 2003/0031954 | A1 | | 2/2003 | Kakuta et al. |
| 2005/0136333 | A1 | | 6/2005 | Lawrence et al. |
| 2007/0042295 | A1 | * | 2/2007 | Berneth ................ G11B 7/245 430/270.14 |
| 2008/0020290 | A1 | * | 1/2008 | Hatakeyama ......... G03F 7/0382 430/4 |
| 2011/0222391 | A1 | * | 9/2011 | Usami ..................... B41M 5/24 369/283 |
| 2013/0229901 | A1 | | 9/2013 | Mochizuki et al. |

FOREIGN PATENT DOCUMENTS

| | | | |
|---|---|---|---|
| JP | 64-56591 A | | 3/1989 |
| JP | 01-99887 A | | 4/1989 |
| JP | 02-293183 A | | 12/1990 |
| JP | 04-010981 | * | 1/1992 |
| JP | 07-320300 A | | 12/1995 |
| JP | 2001-146074 A | | 5/2001 |
| JP | 2003-006932 A | | 1/2003 |
| JP | 2007-514982 A | | 6/2007 |
| JP | 2010-077203 | * | 4/2010 |
| JP | 2012-089195 A | | 5/2012 |

OTHER PUBLICATIONS

Li et al., "Fluorescent poly(arylene ether)s with a 3,5-dipyridyl-1,2,4-triazole pendant group joined by a N=N linkage", J. Macromol. Sci., Pt. A, Pure Appl. Chem., vol. 43 pp. 1279-1291 (2006).*
Zhang et al. "Electrical bistability and WORM memory effects in donor-acceptor polymers based upon poly(N-vinylcarbazole)", ChemPlusChem vol. 77 pp. 74-81 (2012).*
Suzuki et al., "The static recording and readout of the twenty recording layers containing organic dye materials" ISOM Tech. Dig., 2009 (pp. 202-203).*
Sekkat et al. "Correlation between polymer architecture and sub-glass transition temperature light induced molecular movment in azo-polyimide polymers . . . ", JOSA B vol. 15(1) pp. 401-413 (Jan. 1998).*
Ionita et al., "The analytical control of some photochromic materials", J Optoelec. Adv. Mater., vol. 10(11) pp. 2859-2863 (Nov. 2008).*
Jiang et al. "Effect of carbazole-oxadiazole excited state complexes on the efficiency of dye doped . . . ", J. Appl. Phys., vol. 91(10) pp. 6717-6724 (May 2002).*
International Search Report of PCT/JP2014/062599 dated Jun. 10, 2014 [PCT/ISA/210].
Written Opinion of PCT/JP2014/062599 dated Jun. 10, 2014 [PCT/ISA/237].
Notification of Reasons for Refusal, dated Nov. 1, 2016, issued in corresponding Japanese Application No. 2015-519767, 7 pages in English and Japanese.
Communication dated Nov. 2, 2016, issued by the State Intellectual Property Office of the P.R.C. in corresponding Chinese Application No. 201480030296.X.
Office Action dated Jul. 4, 2017, from the State Intellectual Property Office of People's Republic of China in counterpart Chinese Application No. 201480030296.X.

* cited by examiner

FIG. 5

| | Material of Recording Layer | Absorption maximum wavelength | Evaluation of Recording property (CNR) | Evaluation of Long-term stability | |
|---|---|---|---|---|---|
| | | | | Stability of Intensity of reflected beam reflected at interface (Rate of change) | Stability of Recording mark(s) (Rate of change) [Glass transition temperature] |
| Example 1 | 1-aminobutadiene derivative is bonded to PAcN (Compound G) | 373nm | Good (Not Smaller than 35dB) | Good (Lower than 10%) | Good (Lower than 10%) [200°C or higher] |
| Comparative Example 1 | Benzotriazole derivative is bonded to PBzMA (Compound C-1) | 347nm | Good (Not Smaller than 35dB) | Good (Lower than 10%) | Not Good (100%) [61°C] |
| Comparative Example 2 | Benzotriazole derivative (Compound P-1) is dispersed in PBzMA | 347nm | Good (Not Smaller than 35dB) | Not Good (Not Lower than 35%) | Not Good (100%) [47°C] |
| Comparative Example 3 | Terphenyl derivative is bonded to PMMA (Compound D-1) | 303nm | Not Good (0dB) | Good (Lower than 10%) | Not Good (Not Lower than 30%) [140°C] |
| Comparative Example 4 | 1-aminobutadiene derivative (Compound H) is dispersed in PAcN | 376nm | Good (Not Smaller than 35dB) | Not Good (Not Lower than 50%) | Good (Lower than 10%) [200°C or higher] |

FIG. 6

| Dye-bonded polymer compound | Monomer used for forming Polymer binder | Content of Polymer binder [Mass%] | One-photon absorption dye | Content of One-photon absorption dye [Mass%] |
|---|---|---|---|---|
| 1 | Monomer 1-1 | 98 | Monomer 2-1 | 2 |
| 2 | Monomer 1-1 | 96 | Monomer 2-1 | 4 |
| 3 | Monomer 1-1 | 94 | Monomer 2-1 | 6 |
| 4 | Monomer 1-1 | 92 | Monomer 2-1 | 8 |
| 5 | Monomer 1-2 | 96 | Monomer 2-1 | 4 |
| 6 | Monomer 1-2 | 96 | Monomer 2-1 | 4 |
| 7 | Monomer 1-3 | 96 | Monomer 2-1 | 4 |
| 8 | Monomer 1-4 | 96 | Monomer 2-1 | 4 |
| 9 | Monomer 1-5 | 96 | Monomer 2-1 | 4 |
| 10 | Monomer 1-1 | 70 | Monomer 2-2 | 30 |
| 11 | Monomer 1-1 | 60 | Monomer 2-2 | 40 |
| 12 | Monomer 1-2 | 70 | Monomer 2-2 | 30 |
| 13 | Monomer 1-3 | 70 | Monomer 2-2 | 30 |
| 14 | Monomer 1-4 | 70 | Monomer 2-2 | 30 |
| 15 | Monomer 1-5 | 70 | Monomer 2-2 | 30 |
| 16 | Monomer 1-1 | 96 | Monomer 2-3 | 4 |
| 17 | Monomer 1-2 | 96 | Monomer 2-3 | 4 |
| 18 | Monomer 1-3 | 94 | Monomer 2-3 | 6 |
| 19 | Monomer 1-4 | 94 | Monomer 2-3 | 6 |
| 20 | Monomer 1-5 | 96 | Monomer 2-3 | 4 |

US 9,792,944 B2

RECORDING MATERIAL AND OPTICAL INFORMATION RECORDING MEDIUM

CROSS-REFERENCE TO RELATED APPLICATION(S)

This application is a continuation application of International Application No. PCT/JP2014/062599 filed on May 12, 2014, which claims priority to Japanese Patent Application No. 2013-111066 filed on May 27, 2013, the disclosures of which are incorporated herein by reference in their entireties.

TECHNICAL FIELD

The present invention relates to a recording material containing a compound in which a dye is bonded to a polymer compound, and an optical information recording medium comprising a recording layer which contains this recording material and an intermediate layer adjacent to the recording layer.

BACKGROUND ART

As an optical information recording medium comprising recording layers and intermediate layers, for example, JP2012-89195A teaches that the recording layers contain a polymer binder and a dye dispersed in the polymer binder and that the dye absorbs a recording beam and generates heat to thereby cause the polymer binder to undergo a change in shape due to the generated heat, so that a protrusion sticking out from the recording layer into the intermediate layer is formed, whereby information is recordable in the optical information recording medium. JP2012-89195A also teaches an optical information recording medium comprising a large number of recording layers each of which preferably includes a multi-photon absorption dye as a dye in order to minimize influence on an adjacent recording layer at the time of recording or reading information.

SUMMARY OF THE INVENTION

In the optical information recording medium, it is desirable that the performance for recording and/or reading information can be maintained even after a long-term storage of the medium and that the shape (information) formed by irradiation of a recording beam is highly stable. However, for example, in the conventional optical information recording medium in which the dye is merely dispersed in the polymer binder, the dye may disadvantageously spread into the intermediate layer with the lapse of time. If the dye spreads into the intermediate layer, reflection of a light beam will become unlikely to occur at the interface between the recording layer and the intermediate layer, so that the performance for recording and/or reading information may be degraded.

Further, in the case where the recording layer contains a multi-photon absorption dye, an ultrashort-pulse laser with a large peak power is required for recording information. This leads to a problem such as an increase in the cost of an optical information recording apparatus. It is therefore desirable to provide an optical information recording medium in which a laser having a small peak power, such as a semiconductor laser, as used for a conventional optical recording can be used for recording.

With the foregoing drawbacks of the prior art in view, it is an object of the present invention to provide a recording material and an optical information recording medium, which excel in long-term stability and which allow information to be recorded using a laser having a small peak power.

In order to achieve the aforementioned object, there is provided a recording material comprising a dye-bonded polymer compound which contains a polymer compound to which a one-photon absorption dye is bonded, wherein a glass transition temperature of the recording material is higher than 200° C.

Since this material contains a compound in which a one-photon absorption dye is bonded to a polymer compound (hereinafter referred to as a "dye-bonded polymer compound"), spreading of the dye from a layer made of this material into an adjacent layer can be suppressed, so that the stability of the intensity of the beam reflected at the interface can be enhanced. Accordingly, for example, the performance for recording and/or reading information and the performance of an optical element of this recording material can be maintained. Further, since the above material is thermally stable because of its glass transition temperature higher than 200° C., deformation of the shape that has been formed by irradiation with a light beam can be suppressed to thereby enhance the stability of the shape. Furthermore, since the above material contains a one-photon absorption dye, information can be recorded using a laser having a small peak power.

In this description, the "recording material" is not limited to a material used for manufacture of an optical information recording medium and includes any material by which a shape formed by irradiation with a light beam can be retained (i.e., the shape can be recorded).

In the above-described recording material, it is preferable that a main chain of the polymer compound is selected from the group consisting of polyacenaphthylene, poly(N-vinylcarbazole), poly(N-vinylphthalimide), polyindene, and poly(N-trichlorophenyl maleimide).

Further, in the above-described recording material, it is preferable that the one-photon absorption dye is selected from the group consisting of 1-aminobutadiene derivatives, benzotriazole derivatives and acridone derivatives.

In the above-described recording material, the dye-bonded polymer compound, by way of example, has absorption maximum at a wavelength in the range from 300 nm to 400 nm and does not have absorption of light in a visible spectrum range of wavelengths equal to or greater than 450 nm.

With this configuration, for example, in the case where the recording material is used for an optical information recording medium, information can be recorded by a light beam having a wavelength approximately in the 300 to 400 nm range (e.g., 405 nm) and tracking servo control performed during recording and/or reading information can be carried out using a light beam in the visible spectrum range of wavelengths equal to or greater than 450 nm (e.g., 650 nm). This makes it possible to record and/or read information using a semiconductor laser used for the conventional optical information recording.

Further, in order to achieve the aforementioned object, there is provided an optical information recording medium comprising a recording layer and an intermediate layer adjacent to the recording layer, wherein the recording layer comprises the above-described recording material.

With this configuration, since the recording layer comprises the above-described recording material, spreading of the dye from the recording layer into the intermediate layer can be suppressed, so that the stability of the intensity of the beam reflected at the interface can be enhanced. Accordingly, the performance for recording and/or reading information can be maintained. Further, since the above configuration is thermally stable because of the glass transition temperature of the recording material that is higher than 200° C., deformation of the shape that has been formed by irradiation with a light beam can be suppressed to thereby enhance the stability of the shape. Furthermore, since in the above configuration the dye contains a one-photon absorption dye, information can be recorded using a laser having a small peak power.

In the above-described optical information recording medium, the recording layer may be provided in a plurality of layers of the optical information recording medium, and the intermediate layer may be provided between adjacent recording layers.

This makes it possible to achieve a large storage capacity of the optical information recording medium.

In the above-described optical information recording medium, each recording layer may have a first interface and a second interface between the recording layer and two intermediate layers sandwiching the recording layer, and at least one of the first and second interfaces may be configured to deform by heat generated by the one-photon absorption dye absorbing the recording beam to form a protrusion sticking out into at least one of the intermediate layers, whereby information is recorded.

With this configuration, since information can be recorded with a relatively small energy, recording of information at high sensitivity cab be performed.

The above-described optical information recording medium may be configured such that the protrusion is formed in one of the first interface and the second interface by irradiation with the recording beam and the protrusion is not formed in the other one of the first interface and the second interface. In this instance, it is preferable that a difference between refractive indices of the intermediate layer and the recording layer is greater at the interface in which the protrusions is formed than at the interface in which the protrusion is not formed.

With this configuration, the interface in which the protrusion is formed is used for reading the information; for this purpose, the difference between refractive indices of the materials is large at both sides of this interface so that the interface reflectivity becomes relatively large and thus information can be read out easily. In contrast, the interface in which the protrusion is not formed is not used for reading the information; for this reason, the transmittance for a light beam used for recording or reading information (hereinafter referred to as a "recording/reading beam") (i.e., the total transmittance of the first interface and the second interface) can be increased by reducing the difference between refractive indices of the materials at both sides of the interface. Accordingly, in the case of multi-layered recording layers, the light beam can reach far deeper recording layers from the recording/reading beam radiation side. This is advantageous for increasing the storage capacity by increasing the number of recording layers.

In the above-described optical information recording medium, it is preferable that the difference between the refractive index of the intermediate layer forming the interface in which the protrusion is not formed and the refractive index of the recording layer is equal to or smaller than 0.05.

With this configuration, substantially no reflection of light occurs at the interface in which the protrusion is not formed, and in the case of multi-layered recording layers, the light beam can reach far deeper recording layers. This is advantageous for increasing the storage capacity by increasing the number of recording layers.

BRIEF DESCRIPTION OF THE DRAWINGS

FIG. 5 is a table for comparing properties of the optical information recording medium according to Example and properties of the optical information recording media according to Comparative Examples.

FIG. 6 is a table showing examples of a dye-bonded polymer compound.

DESCRIPTION OF EMBODIMENTS

One embodiment of the present invention will be described with reference to the drawings.

Figure 1:
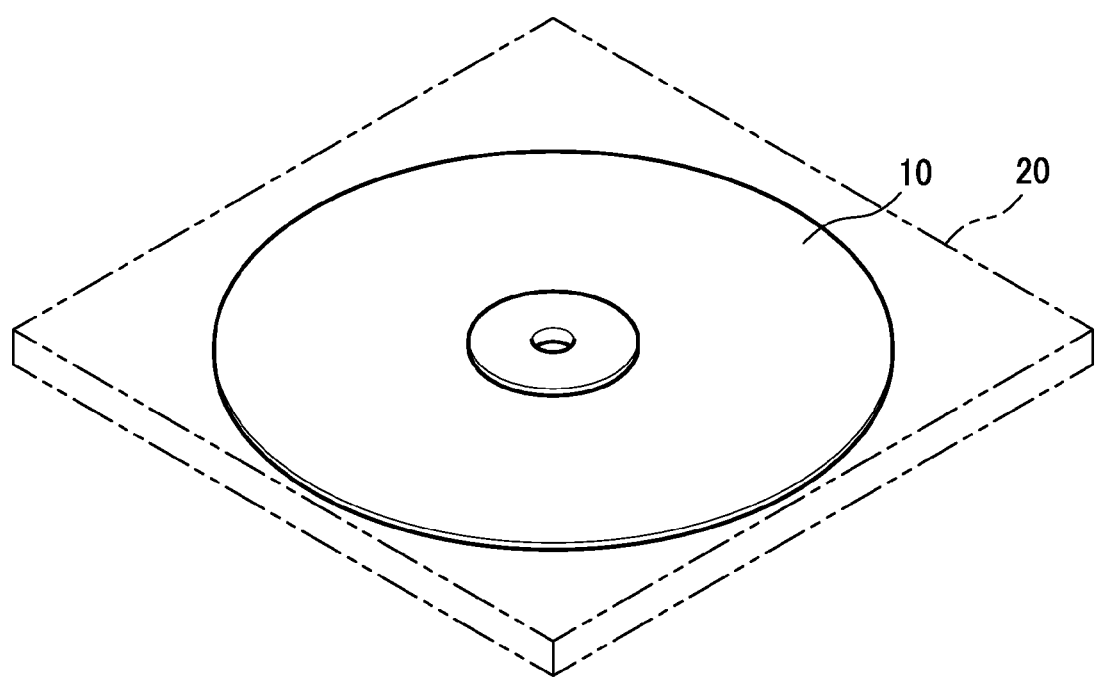
FIG. 1 is a diagram illustrating an optical information recording medium according to one embodiment.

As seen in FIG. 1, an optical information recording medium 10 according to one embodiment of the present invention takes a circular plate shape, and in order to prevent the optical information recording medium 10 from being damaged or soiled due to fall or handling as well as to improve the light fastness, the optical information recording medium 10 is stored in a cartridge case 20.

Figure 2:
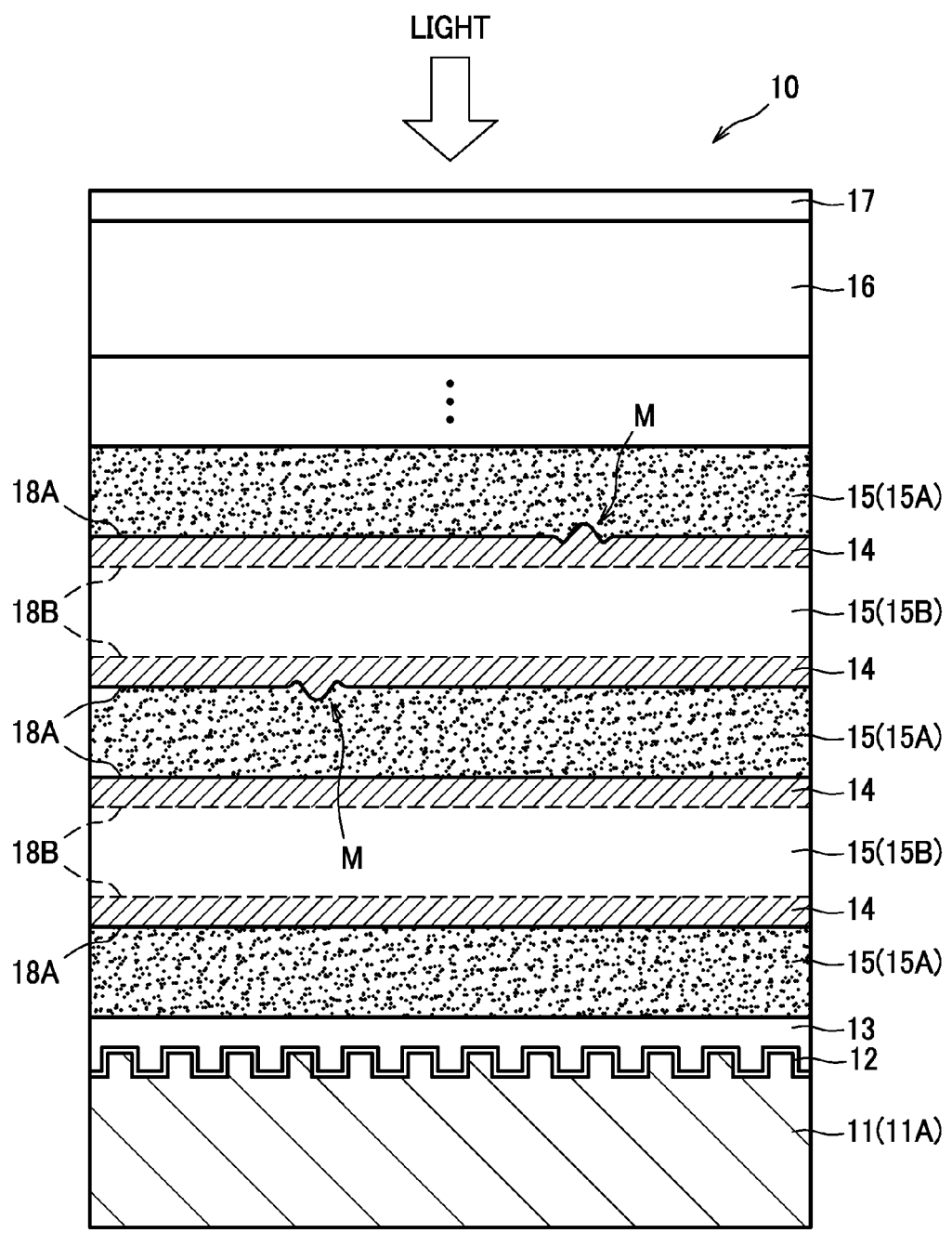
FIG. 2 is a sectional view of the optical information recording medium.

As seen in FIG. 2, the optical information recording medium 10 includes a substrate 11, a reflective layer 12, a spacer layer 13, a plurality of recording layers 14, a plurality of intermediate layers 15 (adhesive agent layers 15A and recording layer support layers 15B), a cover layer 16, and a hard coat layer 17. In this embodiment, an interface formed between a recording layer 14 and an adhesive agent layer 15A is referred to as a recording interface 18A as an example of a first interface, and an interface formed between a recording layer 14 and a recording layer support layer 15B is referred to as a non-recording interface 18B as an example of a second interface.

The substrate 11 is a support member for supporting the recording layers 14, the intermediate layers 15, and other layers. As an example, the substrate 11 is a circular plate made of polycarbonate. In the present invention, the material of the substrate 11 is not specifically limited. It is preferable that the substrate 11 has a thickness in the range of 0.02-2 mm. Further, the substrate 11 according to this embodiment has asperities (servo signal) which functions as a guide for tracking servo on the surface where a recording/reading beam is incident (upper-side surface in the drawing), and therefore the substrate 11 also functions as a guide layer 11A. The guide layer 11A may be a layer where the servo signal has been recorded, for example, by utilizing a change in the refractive index. Further, the guide layer 11A may be provided as a separate layer from the substrate 11.

The reflective layer 12 is a layer for reflecting the servo beam and consists of an aluminum thin film evaporated onto the uneven surface of the substrate 11 (guide layer 11A). Providing the reflective layer 12 makes it possible to detect the servo signal at the incident side of the servo beam, and therefore the structure of the reading apparatus can be simplified.

The spacer layer 13 is a layer for adjusting the distance between the recording layer 14 and the guide layer 11A and made of a material such as thermoplastic resin, thermosetting resin, ultraviolet curable resin, and adhesive. Preferably, the spacer layer 13 has a thickness in the range of 5-100 μm. Providing the spacer layer 13 makes it possible to reduce the likelihood that light reflected by the guide layer 11A affects the recording layer 14 nearest to the guide layer 11A.

The recording layer 14 is a layer made of a light-sensitive recording material on which information is optically recorded; the recording material contains a compound (dye-bonded polymer compound) in which a one-photon absorption dye for absorbing a recording beam is covalently bonded to a polymer binder as an example of a polymer compound.

The polymer binder to which the one-photon absorption dye is bonded may include, for example, a polymer binder containing a main chain that is selected from the group consisting of polyacenaphthylene, poly(N-vinylcarbazole), poly(N-vinylphthalimide), polyindene, and poly(N-trichlorophenyl maleimide). Chemical structural formulae of the monomers from which the above-described polymer binders are formed are shown below.

dyes (phthalocyanine dyes, naphthalocyanine dyes, porphyrin dyes, etc.), azo dyes (including azo-metal chelate dyes), arylidene dyes, complex dyes, coumarin dyes, azole derivatives, triazine derivatives, benzotriazole derivatives, benzophenone derivatives, phenoxazine derivatives, phenothiazine derivatives, 1-aminobutadiene derivatives, cinnamic acid derivatives, acridone derivatives, quinophthalone dyes, etc. Of these dyes, it is preferable that the one-photon absorption dye is selected from 1-aminobutadiene derivatives, benzotriazole derivatives and acridone derivatives. Examples for each of 1-aminobutadiene derivatives, benzotriazole derivatives and acridone derivatives are shown below.

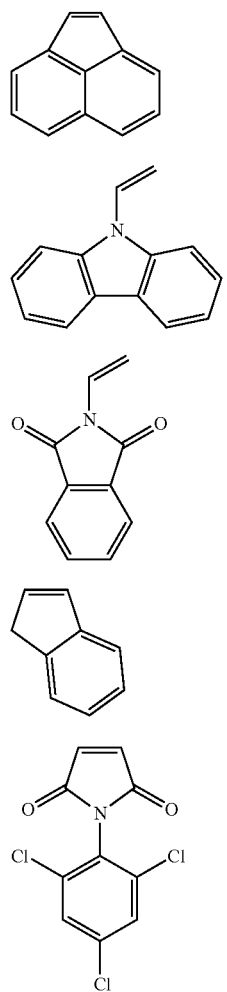

Monomer 1-1

Monomer 1-2

Monomer 1-3

Monomer 1-4

Monomer 1-5

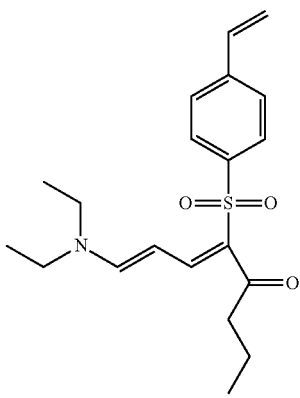

Monomer 2-1

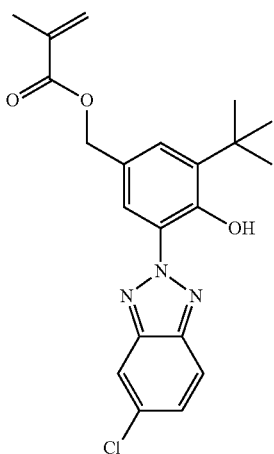

Monomer 2-2

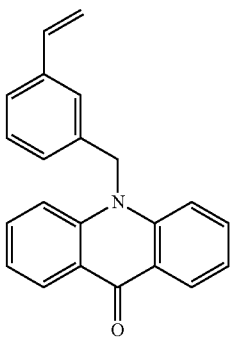

Monomer 2-3

In the above chemical structural formulae, monomer 1-1 is acenaphthylene, monomer 1-2 is N-vinylcarbazole, monomer 1-3 is N-vinylphthalimide, monomer 1-4 is indene, and monomer 1-5 is N-trichlorophenyl maleimide.

The one-photon absorption dye for absorbing the recording beam may include, for example, dyes which have been conventionally used as a thermally deformable heat mode type recording material. Specific examples of the dyes may include methine dyes (cyanine dyes, hemicyanine dyes, styryl dyes, oxonol dyes, merocyanine dyes, etc.), large ring In the above chemical structural formulae, monomer 2-1 is an example of 1-aminobutadiene derivatives, monomer 2-2 is an example of benzotriazole derivatives, and monomer 2-3 is an example of acridone derivatives.

As the dye-bonded polymer compound in which the one-photon absorption dye is bonded to the polymer binder, for example, compound G of the following chemical structural formula may be used. The compound G of this chemical structural formula includes polyacenaphthylene as the main chain of the polymer binder and 1-aminobutadiene derivative as the one-photon absorption dye. It is noted that when 1-aminobutadiene derivatives is used as the one-photon absorption dye, the recording sensitivity can be enhanced. Further, it is noted that when polyacenaphthylene is used as the main chain of the polymer binder, the liquid in which the recording material has been dissolved in a solvent is easily coated and the coated liquid is easily smoothed, so that the productivity of the recording layer 14 and the optical information recording medium 10 can be improved. Further, because polyacenaphthylene has a relatively high refractive index, the difference in refractive index becomes large between the recording layer 14 and the intermediate layer 15 (adhesive agent layer 15A), so that the intensity of the beam reflected at the recording interface 18A can be enhanced.

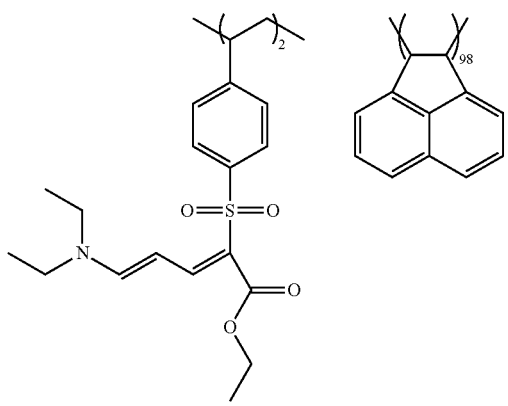

G

By way of example, the dye-bonded polymer compound is a compound which has absorption maximum at a wavelength in the range from 300 nm to 400 nm and does not have absorption in a visible spectrum range of wavelengths equal to or greater than 450 nm. By this dye-bonded polymer compound, for example, information can be recorded using a light beam having a wavelength of 405 nm and tracking servo performed during recording and/or reading information can be carried out using a light beam having a wavelength of 650 nm. This makes it possible to record and/or read information using a semiconductor laser used for the conventional optical information recording. The compound G of the above-described chemical structural formula has absorption maximum at a wavelength at or around 373 nm and does not have absorption at wavelengths in the range of 650±100 nm (wavelength of the light beam used for tracking servo), namely, at wavelengths in the range of 550 nm to 750 nm.

Further, the dye-bonded polymer compound preferably has a molecular weight Mw equal to or greater than 5,000, and more preferably equal to or greater than 8,000.

The recording material containing the above-described dye-bonded polymer compound in which the one-photon absorption dye is covalently bonded to the polymer binder has a glass transition temperature higher than 200° C. Therefore, the recording layer 14 containing this recording material is a thermally stable layer.

The recording layer 14 is a layer for recording dotted recording marks M (information) and configured such that when it is irradiated with a recording beam, the one-photon absorption dye absorbs the recording beam and generates heat, and the generated heat causes the polymer binder to undergo a change in shape to thereby cause the recording interface 18A to stick out into the intermediate layer 15 (adhesive agent layer 15A) to form protrusions. For this reason, each recording layer 14 is thicker than the conventional recording layer containing a polymer binder and a dye, and the thickness of one recording layer 14 is preferably not less than 50 nm. If the thickness is less than 50 nm, the interface between the recording layer and the intermediate layer (corresponding to the recording interface 18A or the non-recording interface 18B in this embodiment) deforms such that a recessed shape is formed with reference to the recording layer as observed before undergoing a change in shape (i.e., the recording layer is recessed partially into the intermediate layer). On the contrary, if the thickness is not less than 50 nm, the interface deforms such that a protrusion is formed at a center of the recorded spot. Although the thickness of the recording layer 14 does not have a determinate upper limit, it is preferable that the thickness thereof is not more than 5 μm in order to provide as many recording layer 14 as possible. To be more specific, the thickness of the recording layer 14 is more preferably in the range of 100 nm to 3 μm, and further preferably in the range of 200 nm to 2 μm. As an example, the thickness of the recording layer 14 is 0.5 μm in this embodiment.

According to the present invention, a recording mark M may include a center portion having a protrusion sticking out from the recording layer 14 into the adhesive agent layer 15A, and the protrusion may be surrounded by a recess which is recessed from the adhesive agent layer 15A into the recording layer 14 (a recessed shape recessed from a position of the recording interface 18A before undergoing a change in shape).

A plurality of recording layers 14 are provided, and the number of recording layers 14 provided is, for example, approximately in the range of 2-100 layers. To increase the storage capacity of the optical information recording medium 10, a large number of recording layers 14, for example, 10 or more recording layers 14 are preferable. This can serve to achieve high-capacity recording of the optical information recording medium 10. Further, the recording layer 14 is made of a material of which the refractive index substantially does not change before and after recording performed by changing the shape of the recording interface 18A.

It is preferable that the recording layer 14 has an absorptance (of one-photon absorption dye) to the recording beam not more than 10% per one layer. Further, in order to increase the number of recording layers 14, it is preferable that the absorptance of each recording layer is as small as possible as long as recording can be performed. Therefore, it is preferable that the absorptance of the recording layer 14 is not more than 8%, more preferably not more than 5%, and further preferably not more than 3%. This is because, for example, if the intensity of the recording beam which reaches the farthermost recording layer 14 has to be equal to or more than 50% of the intensity of the radiated recording beam, it is necessary that the absorptance per one recording layer is equal to or less than 8% in order to obtain eight recording layers, and that the absorptance per one recording layer is equal to or less than 3% in order to obtain twenty recording layers. If the absorptance is higher, the number of recording layers should be smaller; this lessens the effect of increasing the recording capacity by increasing the number of recording layers.

The dye-bonded polymer compound contained in the recording layer 14 preferably comprises the one-photon absorption dye of less than 50 mass % of the polymer binder. In other words, it is preferable that the content in mass percentage of the polymer binder is equal to or more than 50 mass % (i.e., the polymer binder is the main component). By this dye-bonded polymer compound, a sufficient height (amount of protrusion) of the protrusion (recording mark M) can be formed with reference to the recording interface 18A before undergoing a change in shape. When the recording layer 14 is irradiated with the recording beam, the polymer binder undergoes a thermal expansion by absorption of the recording beam, thereafter the irradiation of the recording beam is stopped and the acquired expanded shape is maintained by quenching, to thereby form a protrusion. Therefore, if the content in mass percentage of the one-photon absorption dye is equal to or more than 50 mass % (i.e., the content in mass percentage of the polymer binder is less than 50 mass %), for example, the material of the polymer binder (which undergoes a thermal expansion by absorption of the recording beam) outflows and spills outside the expanded portion, with the result that formation of a protrusion is less likely to occur.

The recording layer 14 may be formed by any conventional method; for example, the dye-bonded polymer compound may be dissolved in a solvent, followed by spin coating or blade coating with the obtained liquid to form a recording layer 14. Examples of the solvent may include dichloromethane, chloroform, methyl ethyl ketone (MEK), acetone, methyl isobutyl ketone (MIBK), toluene, hexane, propyleneglycol monomethylether acetate (PGMEA) and cyclohexanone.

The intermediate layers 15 are provided between the recording layers 14, in other words, each intermediate layer 15 is provided adjacently above and below the recording layer 14 as shown in the drawing. To be more specific, the intermediate layer 15 includes an adhesive agent layer 15A and a recording layer support layer 15B, which are alternately arranged between the recording layers 14. In other words, one recording layer 14 is sandwiched between the adhesive agent layer 15A and the recording layer support layer 15B; in this embodiment, the adhesive agent layer 15A, the recording layer 14, the recording layer support layer 15B, and the recording layer 14 are repeatedly arranged in this order as viewed from the substrate 11 side.

In order to prevent crosstalk across a plurality of recording layers 14, the intermediate layer 15 is provided to from a predetermined amount of space between the adjacent recording layers 14. For this purpose, it is preferable that the thickness of the intermediate layer 15 is not less than 2 µm, and more preferably not less than 5 µm. Further, as long as the crosstalk can be prevented, it is preferable that the thickness of the intermediate layer 15 is as small as possible, such as 20 µm or less. In this embodiment, the thickness of the intermediate layer 15 (i.e., adhesive agent layer 15A and recording layer support layer 15B) is 10 µm each as an example. Since the thickness of the adhesive agent layer 15A and the thickness of the recording layer support layer 15B are the same, namely 10 µm, the recording interface 18A have non-constant pitches of 10 µm, 11 µm, 10 µm, 11 µm . . . . This can reduce the likelihood that the interference between a readout beam (i.e., the beam reflected at the recording interface 18A to be generated upon reading information) and a reflected beam of a reading beam (i.e., the reflected beam of the reading beam generated at a recording interface 18A that is adjacent to the recording interface 18A used for reading the information) affects the readout beam.

The intermediate layers 15 are made of materials which are unreactive to irradiation with a laser beam at the time of recording and reading out the information. Further, in order to minimize the loss of the recording beam, the reading beam, and the readout beam (light including a readout signal generated by irradiation with the reading beam), it is preferable that each of the intermediate layers 15 is made of a material which does not substantially absorb the recording beam, the reading beam, and the readout beam, in other words, a material which is transparent to the recording beam, the reading beam, and the readout beam. Herein, the term "transparent" indicates that the absorptance is not more than 1%.

The adhesive agent layer 15A has adhesiveness to enable attachment to another surface and is softer than the recording layer 14. For example, the glass transition temperature of the adhesive agent layer 15A is lower than that of the recording layer 14. On the other hand, the recording layer support layer 15B is made of a material such as ultraviolet curable resin and is harder than the adhesive agent layer 15A. For example, the recording layer support layer 15B has a glass transition temperature higher than that of the adhesive agent layer 15A.

As described above, the adhesive agent layer 15A is used as the intermediate layer 15 that is adjacent to one side of the recording layer 14, and the recording layer support layer 15B harder than the adhesive agent layer 15A is used as the intermediate layer 15 that is adjacent to the other side of the recording layer 14, and thus when the recording layer 14 is heated, and caused to expand, by irradiation with the recording beam, the recording layer 14 deforms toward the adhesive agent layer 15A that is the softer one of the intermediate layers 15 sandwiching the recording layer 14 (i.e., the adhesive agent layer 15A and the recording layer support layer 15B) to form a protrusion in the recording interface 18A. Accordingly, the optical information recording medium 10 in this embodiment is configured such that when the recording layer 14 is irradiated with the recording beam, no protrusion is formed in the non-recording interface 18B which is the interface between the recording layer 14 and the recording layer support layer 15B but a protrusion (recording mark M) is formed in the recording interface 18A which is the interface between the recording layer 14 and the adhesive agent layer 15A.

To compare the hardnesses of the recording layer 14, the adhesive agent layer 15A and the recording layer support layer 15B, the materials used for forming the recording layer 14, the adhesive agent layer 15A and the recording layer support layer 15B are made into bulk bodies, which are then pressed to each other. To be more specific, when the bulk bodies are pressed to each other, it can be checked that the softer one will be recessed more deeply than the harder one.

The adhesive agent layer 15A and the recording layer support layer 15B have different refractive indices, but the recording layer support layer 15B and the recording layer 14 have the same refractive index. Herein, "having the same refractive index" indicates that the two refractive indices are substantially the same. To be more specific, the recording layer 14 and the recording layer support layer 15B have comparative refractive indices such that $((n3-n1)/(n3+n1))^2 \leq 0.0003$ is satisfied, where n1 represents the refractive index of the recording layer 14, and n3 represents the refractive index of the recording layer support layer 15B, that is, the reflectivity at the non-recording interface 18B is not more than 0.0003.

To prevent reflection at the interface (non-recording interface 18B) between the recording layer 14 and the recording layer support layer 15B, it is preferable that the refractive indices of the recording layer 14 and the recording layer support layer 15B are as close as possible and that the difference between the refractive indices of the recording layer 14 and the recording layer support layer 15B is preferably not more than 0.05, more preferably not more than 0.03, further preferably not more than 0.01, and most preferably 0. As an example, if the refractive index n1 of the recording layer 14 is 1.565 and the refractive index n3 of the recording layer support layer 15B is 1.564, $((n3-n1)/(n3+n1))^2$ is almost 0.

On the contrary, the refractive indices of the adhesive agent layer 15A and the recording layer 14 are different from each other to some appropriate degree. Accordingly, the refractive index rapidly changes at the interface (recording interface 18A) between the recording layer 14 and the adhesive agent layer 15A, so that the reading beam can be reflected. To be more specific, it is preferable that the difference between the refractive indices of the adhesive agent layer 15A and the recording layer 14 is greater than the difference between the refractive indices of the recording layer support layer 15B and the recording layer 14 and is not more than 0.11. To be more specific, the refractive indices of the recording layer 14 and the adhesive agent layer 15A are different from each other to some appropriate degree such that the following relation is satisfied:

$$0.0005 < ((n2-n1)/(n2+n1))^2 \leq 0.04$$

where n2 represents the refractive index of the adhesive agent layer 15A, that is, the reflectivity at the recording interface 18A is not less than 0.0005 and not more than 0.04.

If the reflectivity is not less than 0.0005, the quantity of the reflected beam reflected at the reflective interface 18A is large, so that a high signal-to-noise ratio is obtained at the time of reading the information. Further, if the reflectivity is not more than 0.04, the quantity of the reflected beam reflected at the reflective interface 18A is restricted to an appropriately small degree, so that the recording/reading beam can reach far deeper recording layers 14 without considerable attenuation upon recording and reading out the information. This makes it possible to achieve high storage capacity of the optical information recording medium 10 by providing a large number of recording layers 14. As an example, if the refractive index n1 of the recording layer 14 is 1.565 and the refractive index n2 of the adhesive agent layer 15A is 1.477, $((n2-n1)/(n2+n1))^2$ is approximately 0.0008.

As described above, the refractive indices of the recording layer 14 and the intermediate layer 15 can be adjusted to enhance the total transmittance of the recording interface 18A and the non-recording interface 18B; therefore, in the case of multi-layered recording layers, the light beam can reach far deeper recording layers 14 from the recording/reading beam radiation side. This is advantageous for increasing the storage capacity by increasing the number of recording layers. Especially in this embodiment, since the refractive index of the recording layer support layer 15B and the refractive index of the recording layer 14 are substantially the same (the difference between the refractive indices is not more than 0.05), the light reflectivity at the non-recording interface 18B is substantially zero, so that the light beam can reach far deeper recording layers 14. This is advantageous for increasing the storage capacity by increasing the number of recording layers.

In order to adjust the refractive indices of the recording layer 14 and the intermediate layer 15, the composition of the material for the recording layer 14 and the composition of the material for the intermediate layer 15 can be adjusted. To be more specific, since the material for the recording layer 14 (recording material) contains a dye-bonded polymer compound in which a one-photon absorption dye is bonded to a polymer binder, the polymer binder or the dye may be selectively adjusted to have an appropriate refractive index and to vary the composition ratio, whereby the refractive index of the recording layer 14 can be adjusted as desired. The refractive index of the polymer binder varies depending on the degree of polymerization even if they have similar basic components. For this reason, the refractive index of the recording layer 14 can also be adjusted using polymer binder with different degrees of polymerization or by adjusting the degree of polymerization of the polymer binder. Further, the refractive index of the recording layer 14 can be adjusted by mixing a plurality of polymer binders. Further, a refractive index matching material (inorganic particulate and the like) may be added to adjust the refractive index of the recording layer 14.

To adjust the refractive index of the intermediate layer 15, the degree of polymerization of the polymer material such as resin usable as the material for the intermediate layer 15 may be adjusted. Further, to adjust the refractive index of the intermediate layer 15, a material usable for the intermediate layer 15 may be added as desired or a refractive index matching material (inorganic particulate and the like) may be added.

The cover layer 16 is a layer for protecting the recording layers 14 and the intermediate layers 15, and is made of a material which allows the recording beam, the reading beam, and the readout beam to pass through the cover layer 16. As an example, the cover layer 16 may be formed by applying and curing ultraviolet curable resin or by attaching a film via adhesive or the like. Providing the cover layer 16 can prevent the recording layers 14 and the intermediate layers 15 from being damaged or soiled. It is preferable that the thickness of the cover layer 16 is in the range of 0.01-0.2 mm. If the cover layer 16 is too thin, damage or soil of the cover layer 16 may be detected during recording and reading the information. On the other hand, if the cover layer 16 is too thick, aberration may occur in the optical system of an optical information recording apparatus. However, the above configuration can restrict these disadvantages.

The hard coat layer 17 is a layer provided on the light-incident surface (upper surface in the drawing) of the optical information recording medium 10, and is made of a material such as urethane resin, acrylic resin, urethane acrylate resin, and epoxy resin. Providing the hard coat layer 17 can prevent the light-incident surface of the optical information recording medium 10 from being damaged or soiled. According to the present invention, the hard coat layer may also serve as the above-described cover layer.

To provide identification information for individual optical information recording media, the optical information recording medium 10 may be partly marked with a bar cord or the like. This marking may be carried out by a thermal destruction method used for a conventional optical disc, such as disclosed in Japan Patent Nos. 3143454 and 3385285, in which the reflective layer 12 is irradiated with a laser beam for thermal destruction, and by any other method such as irradiation of the recording layer 14 with a laser beam, or printing.

Next, description will be given of a method of recording/reading information on/from the optical information recording medium 10 configured as described above.

Figure 3:
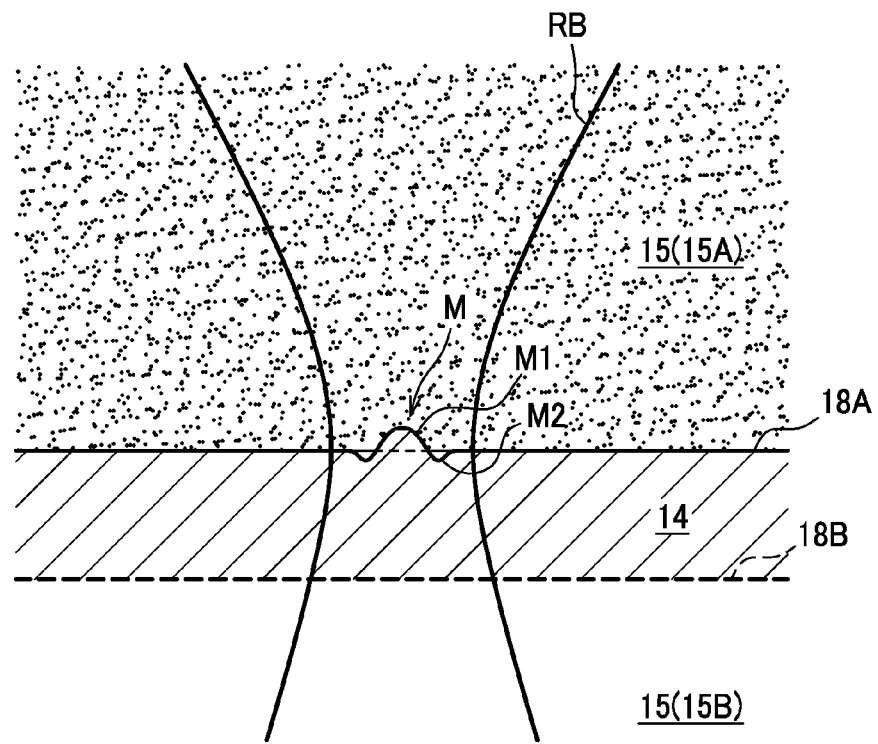
FIG. 3 is a diagram illustrating a recording mark formed at the time of recording information.

To record information in a desired recording layer 14, as seen in FIG. 3, the recording layer 14 is irradiated with a laser beam (recording beam RB) output of which is modulated in accordance with the information to be recorded. In this embodiment, since the dye contained in the recording layer 14 is a one-photon absorption dye, a laser such as a semiconductor laser used for the conventional optical information recording apparatus and having a small peak power (e.g., continuous wave laser) can be adequately used to produce a laser beam. Although a focal position of the recording beam RB is not limited to a specific position, it is preferable that the recording beam RB is focused on or around the recording interface 18A. To be more specific, it is preferable that the focal position is adjusted on the recording interface 18A and thereafter slightly shifted toward the recording layer 14.

When irradiating the recording layer 14 with the recording beam RB, the recording beam-irradiated area changes its shape such that the center portion thereof has a shape protruding from the recording layer 14 into the adhesive agent layer 15A (intermediate layer 15), to thereby form a recording mark M (pit). More specifically, the recording mark M shown in FIG. 3 includes a protrusion M1 at the center portion, and a ring-shaped recess portion M2 surrounding the protrusion M1 and recessed into the recording layer 14. The distance of the recess portion M2 from the recording interface 18A (the recording interface 18A before undergoing a change in shape) to the deepest portion of the recess portion M2 is smaller than the distance of the protrusion M1 from the recording interface 18A (the recording interface 18A before undergoing a change in shape) to the peak of the protrusion M1. In other words, it can be said that the recording mark M as a whole has a generally protruding shape. Depending on the recording conditions, the optical information recording medium 10 may only include protrusions M1 without formation of any recess portions M2 surrounding the protrusions.

As described above, since information can be recorded in the optical information recording medium 10 as protrusions sticking out from the recording layer 14 into the adhesive agent layer 15A, it is not necessary to require such a high energy that can result in decomposing or changing in phase of the recording layer, nor does it require such a large absorptance of the recording layer as is required in the conventional recording for the formation of recess portions; therefore, the information can be recorded with a relatively small energy. Accordingly, information can be recorded at high sensitivity, and as the required absorptance to the recording beam per recording layer 14 is smaller, the number of recording layers 14 can be increased.

Figure 4:
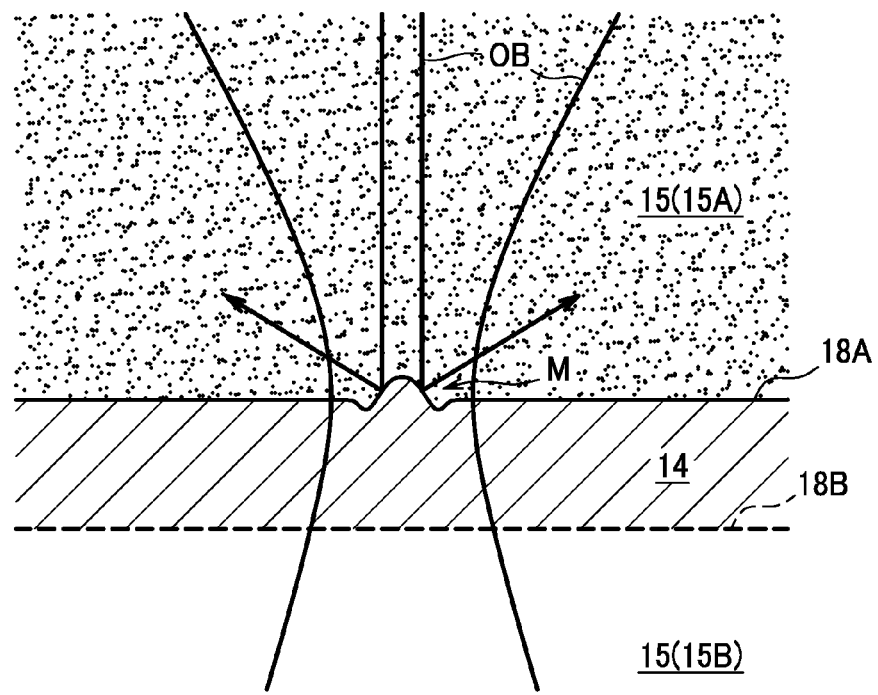
FIG. 4 is a diagram explaining the operation at the time of reading the information.

As seen in FIG. 4, when the recording mark M is irradiated with the reading beam OB using a continuous wave laser, the reading beam OB is reflected at the recording interface 18A because of the difference between the refractive index of the recording layer 14 and the refractive index of the adhesive agent layer 15A. At this time, a difference in the light intensity will appear between the reflected beam reflected at the recording interface 18A surrounding the recording mark M and the reflected beam reflected at the recording mark M, so that the recording mark M can be detected based on the difference of the reflectivity. It is noted that since the refractive index of the recording layer 14 does not change as a result of recording information, a reflection of the reading beam OB occurs only at the recording interface 18A but not at the non-recording interface 18B nor inside the recording layer 14, which leads to stable detection of the recording mark M. For the purpose of this optical detection, it is preferable that the protrusion M1 sticks out approximately in the range of 1-300 nm with reference to the interface (recording interface 18A) before undergoing a change in shape.

In this embodiment, since the recording mark M includes the recess portion M2 surrounding the protrusion M1, it is assumed that when the recording mark M is irradiated with the reading beam OB for reading the recording mark M, the light intensity distribution of the reflected beam reflected at the recording mark M shows an abrupt change in accordance with the distance from the center of the protrusion M1, as compared with a recording mark M only including a protrusion M1. This makes it possible to read the recording mark M with high degree of modulation.

The present invention is applicable not only for recording information by causing the recording layer 14 to deform to form a protrusion, but also for recording the information by forming a recess portion. For example, the recording layer 14 may be deformed into a recess shape to record the information using a recording beam with an increased level of energy as obtained by increasing the energy of the recording beam, such as by increasing the peak power of the recording beam. Further, the non-recording interface 18B may deform upon recording the information in the optical information recording medium 10 according to this embodiment; however, since the reflection of the reading beam OB does not occur at the non-recording interface 18B, this deformation in the non-recording interface 18B does not affect reading of the information.

As described above, since the optical information recording medium 10 according to this embodiment includes a one-photon absorption dye as a dye contained in the recording layer 14 (recording material), information can be recorded using a laser beam having a small peak power. Further, if a semiconductor laser is used to emit a laser beam having a small peak power, the power of the laser beam can be readily adjusted.

Further, since the recording layer 14 (recording material) of the optical information recording medium 10 contains a dye-boded polymer compound, spreading of the dye from the recording layer 14 into the intermediate layer 15 can be suppressed, so that the stability of the intensity of the reflected beam reflected at the recording interface 18A can be enhanced. Accordingly, the performance for recording and/or reading information can be maintained. Further, since the optical information recording medium 10 is thermally stable because of the glass transition temperature of the recording layer 14 (recording material) that is higher than 200° C., deformation of the recoding mark M can be suppressed and the stability of the recording mark M (information) can be enhanced. The optical information recording medium 10 in this embodiment excels in long-term stability because the stability of the intensity of the reflected beam reflected at the recording interface 18A can be enhanced and the stability of the recording mark M can be enhanced.

Although one embodiment of the present invention has been described above, the present invention is not limited to the above-described embodiment and various changes and modifications may be made where necessary.

In the above-described embodiment, the optical information recording medium 10 is configured such that when a recording layer 14 is irradiated with the recording beam, a protrusion is formed in only one interface (recording interface 18A) and a protrusion is not formed in the other interface (non-recording interface 18B); however, the present invention is not limited to this configuration. Namely, the optical information recording medium according to the present invention may be configured such that a protrusion sticking out into the adjacent intermediate layer is formed on each interface of the recording layer as separate information. To be more specific, this configuration can be achieved if all the intermediate layers adjacent to one recording layer are made, for example, of the adhesive agent layer 15A in the above-described embodiment. In this modification, in order to prevent crosstalk across a plurality of recording layers 14, it is preferable that each one of the recording layers has a thickness not less than 2 μm, more preferably not less than 5 μm, and further preferably not less than 7 μm. Although the thickness of the recording layer does not have a determinate upper limit, in order to increase the number of recording layers, it is preferable that the thickness thereof is thinner (e.g., not more than 20 μm) as long as the crosstalk does not occur across the recording layers.

In the above-described embodiment, the optical information recording medium 10 includes the guide layer 11A, the reflective layer 12, the spacer layer 13, the cover layer 16 and the hard coat layer 17 as shown in FIG. 2. However, the present invention is not limited to this specific configuration, and these layer may be optionally provided. Further, in the above-described embodiment, the optical information recording medium 10 is stored in the cartridge case 20 as shown in FIG. 1. However, the present invention is not limited to this configuration, and the optical information recording medium 10 may not be stored in the cartridge case. Further, in the above-described embodiment, the optical information recording medium 10 with a plurality of recording layers 14 has been exemplified. However, the present invention is not limited to this configuration, and the number of recording layers may be one.

In the above-described embodiment, by way of example, the recording material according to the present invention has been used as a material for the recording layers 14 of the optical information recording medium 10. However, the present invention is not limited to this configuration. For example, the recording material according to the present invention may be used as a material for a layer of a diffractive optical element that can be utilized as an image display device, security device or an optical filter element, in which layer a diffractive optical element pattern (e.g., deformations or recesses) is formed.

EXAMPLES

Description will be given of experiments for characterization of the optical information recording medium according to the present invention.

Recording Material

Example 1

In Example 1, a dye-bonded polymer compound in which a one-photon absorption dye was bonded to a polymer binder was used as a material for a recording layer (recording material).

To be more specific, the compound G having the above chemical structural formula was used. The content in mass percentage of the one-photon absorption dye in the recording material was 2 mass %.

The compound G was synthesized by the following method:

(1) Synthesis of Compound H (1-aminobutadiene derivative)

The synthesis of the compound H was carried out by the following procedures:

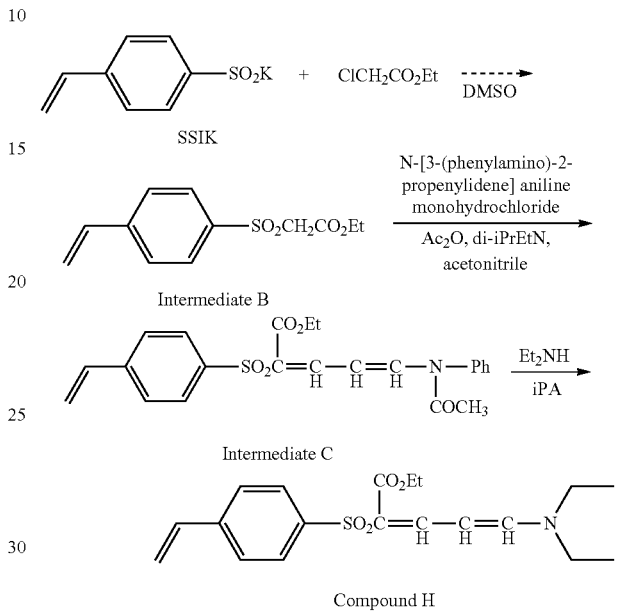

Compound H 10 ml of dimethyl sulfoxide (DMSO) solution containing 15.3 g of ethyl chloroacetate was added to 150 ml of dimethyl sulfoxide (DMSO) solution containing 31 g of SSIK® (manufactured by FUJIFILM Finechemicals Co., Ltd.) and stirred for two hours at 60° C. The obtained solution was allowed to cool, followed by extraction with ethyl acetate and washing with water, to thereby obtain 30 g of Intermediate B.

22.9 g of Intermediate B and 23.3 g of N-[3-(phenylamino)-2-propenylidene]aniline monohydrochloride were dissolved in 45 ml of acetonitrile, followed by addition of 23 ml of diisopropylethylamine and 19.2 ml of acetic anhydride and stirring for two hours at 80° C. After allowing it to cool, 90 ml of isopropanol and 180 ml of water were added for crystallization, and 32 g of Intermediate C was obtained.

3.2 ml of diethylamine was added to 13 ml of isopropanol solution containing 6.6 g of Intermediate C and stirred for three hours at 60° C., followed by adding water to separate residue. The residue was then recrystallized using ethyl/hexane to thereby obtain 3.5 g of Compound H.

(2) Synthesis of Compound G 7.2 ml of propylene glycol monomethylether acetate was stirred while being heated under nitrogen atmosphere at 90° C. To this heated and stirred propylene glycol monomethylether acetate, 7.2 ml solution of propylene glycol monomethylether acetate to which 0.23 g of Compound H obtained by the above-described synthesis, 5.77 g of acenaphthylene and 0.27 g of V-601 (manufactured by Wako Pure Chemical Industries, Ltd.) had been added was added dropwise for 2 hours. After that, 0.27 g of V-601 was added, and the mixture was then stirred for 8 hours while being heated at 90° C., and allowed to cool, to thereby obtain a propylene glycol monomethylether acetate solution containing 30 mass % of Compound G (Mw=approx. 8000).

Comparative Example 1

In Comparative Example 1, a compound in which a one-photon absorption dye was bonded to a polymer compound was used as a material for the recording layer.

To be more specific, the following compound C-1 was used. It is to be noted that the content in mass percentage of the one-photon absorption dye in the material for the recording layer was 22 mass %.

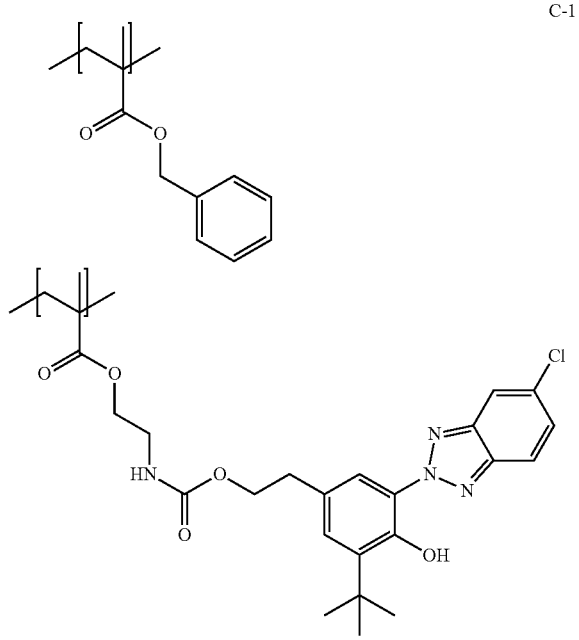

C-1

The Compound C-1 was synthesized by the following method:

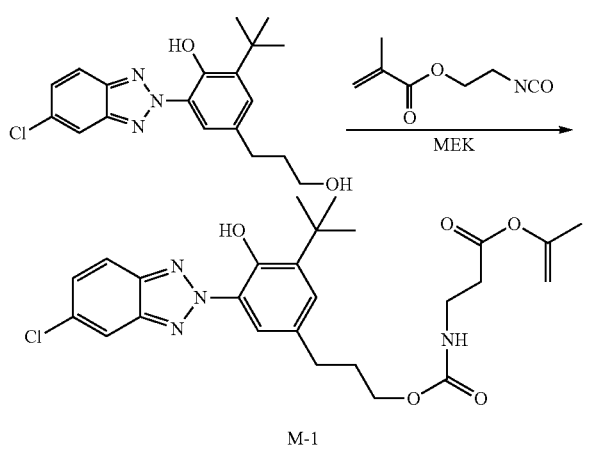

M-1

(1) Synthesis of Raw Material Compound M-1

Tinuvin® 109 manufactured by BASF was hydrolyzed and reduced to obtain 0.7 g of 3-[3-tert-butyl-5-(5-chloro-2H-benzotriazol-2-yl)-4-hydroxyphenyl]propanol, which was then dissolved in 5 ml of methyl ethyl ketone, together with 0.31 g of Karenz MOI® manufactured by Showa Denko K.K. After that, 0.02 g of dibutyltin laurate and 0.02 g of p-methoxyphenol were added thereto and reacted at 75° C. for 4 hours, followed by distillation of the solvent to obtain 1.0 g of Compound M-1.

(2) Synthesis of C-1

3.4 ml of propylene glycol monomethylether acetate was stirred while being heated under nitrogen atmosphere at 90° C. To this heated and stirred propylene glycol monomethylether acetate, 3.4 ml solution of propylene glycol monomethylether acetate to which 1.0 g of Compound M-1, 3.5 g of benzyl methacrylate, and 0.14 g of V-601 (manufactured by Wako Pure Chemical Industries, Ltd.) had been added was added dropwise for 2 hours. After that, 0.14 g of V-601 was added thereto, and the resultant solution was then stirred for 4 hours while being heated at 90° C., and allowed to cool, to thereby obtain 11 g of a propylene glycol monomethylether acetate solution containing 40 mass % of the compound C-1.

Comparative Example 2

In Comparative Example 2, a one-photon absorption dye dispersed in a polymer binder was used as a material for the recording layer.

To be more specific, polybenzylmethacrylate was used as the polymer binder, and the compound P-1 (3-[3-tert-butyl-5-(5-chloro-2H-benzotriazol-2-yl)-4-hydroxyphenyl]propanol) as shown below was used as the one-photon absorption dye.

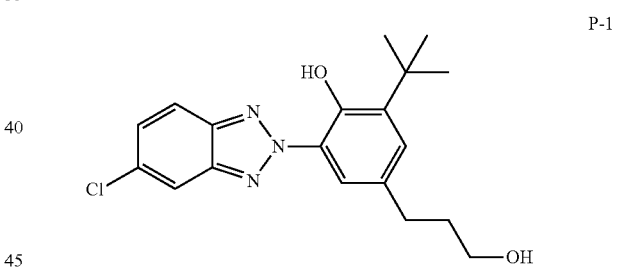

P-1

Tinuvin® 109 manufactured by BASF was hydrolyzed and reduced to obtain the compound P-1.

Comparative Example 3

In Comparative Example 3, a compound in which two-photon absorption dye was bonded to a polymer binder was used as a material for the recording layer.

To be more specific, the following compound D-1 was used. It is to be noted that the content in mass percentage of the two-photon absorption dye in the material for the recording layer was 40 mass %.

D-1

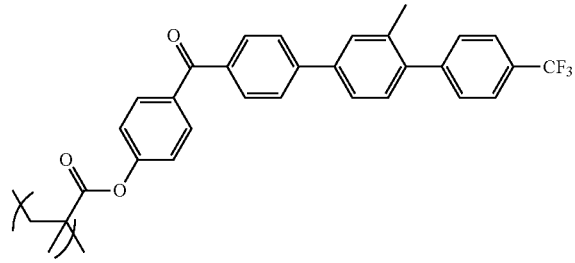
The compound D-1 was synthesized by the following method:
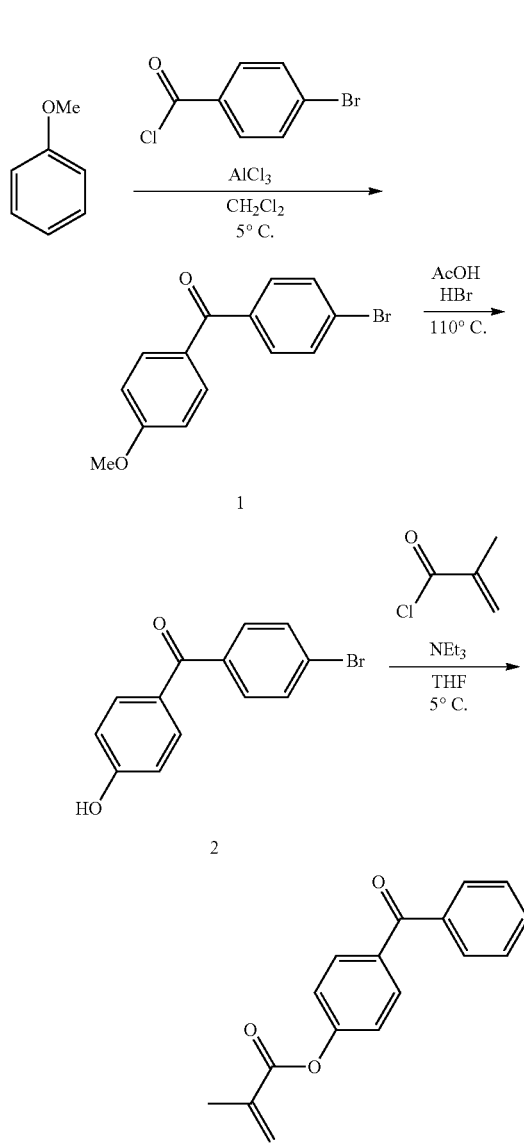
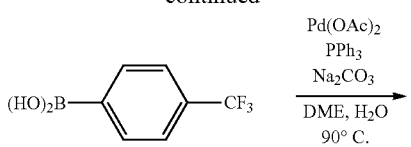
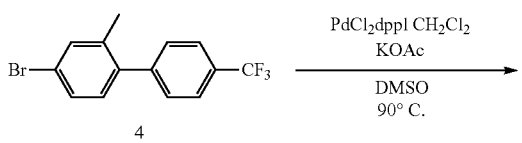

-continued

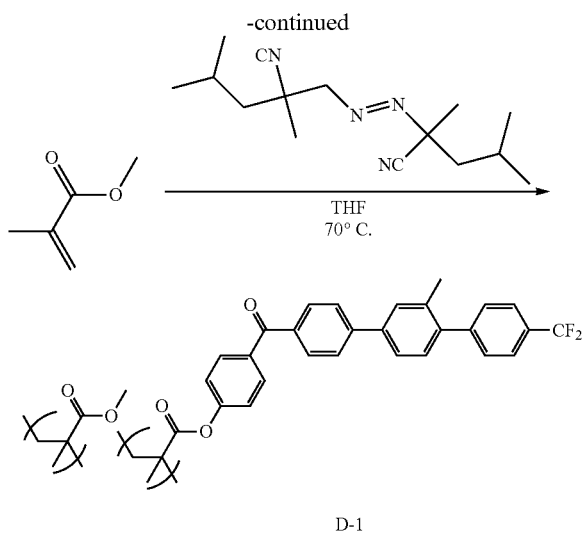

D-1

(1) Synthesis of Raw Material Compound 1

27.0 g (250 mmol) of anisole and 42.9 g (200 mmol) of 4-bromobenzoyl chloride were dissolved in 500 ml of methylene chloride and cooled to an inner temperature of 5° C., and thereafter, 33.4 g (250 mmol) of aluminum chloride was divided into six batches and separately added thereto, and stirred for 8 hours under nitrogen atmosphere. The reaction solution was poured into water, followed by extraction with methylene chloride and evaporation to dryness using a rotary evaporator, to thereby obtain white-colored compound 1 in a quantitative manner. It was verified by $^1$H NMR that the obtained compound 1 was the target product.

(2) Synthesis of Raw Material Compound 2

140 ml of hydrobromic acid and 220 ml of acetic acid were added to 35.0 g (120 mmol) of Raw material compound 1, and the mixture was stirred for 12.5 hours at an inner temperature of 110° C. After allowing the reaction solution to cool to room temperature, the reaction solution was poured into water and stirred for 20 minutes at room temperature. The precipitate was separated out through filtration, and then washed with pure water and hexane:ethyl acdetate=5:1 and dried under reduced pressure to obtain white-colored compound 2 in a quantitative manner. It was verified by $^1$H NMR that the obtained compound 2 was the target product.

(3) Synthesis of Raw Material Compound 3

9.74 g (35.1 mmol) of Raw material compound 2 was dissolved in 70 ml of tetrahydrofuran, and 7.10 g (70.2 mmol) of triethylamine was added thereto. The mixture was cooled to an inner temperature of 5° C. and then stirred for 2 hours under nitrogen atmosphere while adding thereto dropwise 3.67 g (35.1 mmol) of methacrylic acid chloride. The reaction solution was poured into water and stirred for 20 minutes at room temperature. The deposited precipitate was separated out and dried at room temperature, to thereby obtain white-colored compound 3 in a quantitative manner. It was verified by $^1$H NMR that the obtained compound 3 was the target product.

(4) Synthesis of Raw Material Compound 4

350 ml of 1,2-dimethoxyethane and 70 ml of water were added to 63.5 g (214 mmol) of 5-bromo-2-iodotoluene, 44.7 g (235 mmol) of para-trifluoromethylphenyl boronic acid, 2.40 g (10.7 mmol) of palladium diacetate, and 68.0 g (642 mmol) of sodium carbonate, and the mixture was stirred for 72 hours under nitrogen atmosphere at an outer temperature of 90° C. The reaction solution was allowed to cool to room temperature, followed by extraction with ethyl acetate and concentration using a rotary evaporator, and then purified on a silica gel column (hexane) to obtain 57.9 g (yield: 86%) of white-colored compound 4. It was verified by $^1$H NMR that the obtained compound 4 was the target product.

(5) Synthesis of Raw Material Compound 5

400 ml of dimethylsulfoxide was added to 57.9 g (184 mmol) of Raw material compound 4, 56.1 g (221 mmol) of bispinacolatodiboron, 4.25 g (5.20 mmol) of [1,1'-bis(diphenylphosphino)ferrocene]palladium(II) dichloride dichloromethane adduct, and 54.2 g (552 mmol) of potassium acetate, and the mixture was stirred for 5 hours under nitrogen atmosphere at an inner temperature of 90° C. The reaction solution was allowed to cool to room temperature, followed by extraction with ethyl acetate and concentration using a rotary evaporator, and then purified on a silica gel column (hexane:ethyl acetate=10:1) to obtain 57.5 g (yield: 86%) of white-colored compound 5. It was verified by $^1$H NMR that the obtained compound 5 was the target product.

(6) Synthesis of Raw Material Compound 6

170 ml of toluene and 20 ml of water were added to 14.8 g (42.9 mmol) of Raw material compound 3, 18.6 g (51.5 mmol) of Raw material compound 5, and 2.48 g (2.15 mmol) of tetrakistriphenylphosphine palladium, 17.8 g (129 mmol) of potassium carbonate, and 1 mg of dibutylhydroxytoluene, and the mixture was stirred for 12 hours under nitrogen atmosphere at an outer temperature of 90° C. The reaction solution was allowed to cool to room temperature, followed by extraction with ethyl acetate and concentration using a rotary evaporator, and then purified on a silica gel column (ethyl acetate:hexane=1:5), recrystallized from ethyl acetate/hexane, separated out by filtration, and dried to obtain 6.8 g (yield: 32%) of white-colored compound 6. It was verified by $^1$H NMR that the obtained compound 6 was the target product. $^1$H NMR (CDCl3) 7.92 (d, 4H), 7.76 (dd, 2H), 7.71 (d, 2H), 7.59-7.55 (m, 2H), 7.50 (d, 2H), 7.34 (d, 1H), 7.29 (dd, 2H), 6.41 (s, 1H), 5.82 (t, 1H), 2.37 (s, 3H)

(7) Synthesis of Compound D-1

5 g of tetrahydrofuran was stirred under nitrogen atmosphere at an outer temperature of 70° C., and then 2.00 g (4.00 mmol) of Raw material compound 6 dissolved in 26.7 g of tetrahydrofuran, 11.6 g (116 mmol) of methyl methacrylate, and 29.8 mg (0.12 mmol) of 2,2'-azobis(2,4-dimethylvaleronitrile) were added dropwise thereto for 2 hours, followed by stirring for 8 hours. After the reaction solution was allowed to cool to room temperature, the reaction solution was diluted with acetone, recrystallized from acetone/hexane, separated by filtration and dried to obtain 4.77 g of Compound D-1. The composition of the obtained polymer was checked with $^1$H NMR, and the molecular weight of the obtained polymer was measured by GPC (compositional ratio: Raw material compound 6/methyl methacrylate=12/88 (by mol), Mw: 367,000).

Comparative Example 4

In Comparative Example 4, a one-photon absorption dye dispersed in a polymer binder was used as a material for the recording layer.

To be more specific, polyacenaphthylene was used as the polymer binder, and the above-described compound H (1-aminobutadiene derivative) was used as the one-photon absorption dye.

Production of Optical Information Recording Medium

Example 1

(1) Formation of Intermediate Layer (Recording Layer Support Layer)

Ultraviolet curable resin (SD-640 manufactured by DIC Corporation, Tg=86° C.) was applied to a glass substrate (diameter: 120 mm, thickness: 1 mm) by spin coating to make a layer of 20 μm thickness. The ultraviolet curable resin was cured by irradiation with ultraviolet light to thereby form an intermediate layer (recording layer support layer).

(2) Formation of Recording Layer

The above-described compound G was dissolved in propyleneglycol monomethylether acetate such that the solid content concentration thereof was adjusted to 13 mass %, to thereby prepare a coating liquid. After that, the coating liquid was applied onto the intermediate layer (recording layer support layer) by spin coating to form a recording layer having a thickness of 0.5 μm.

(3) Formation of Intermediate Layer (Adhesive Agent Layer)

As a releasable sheet, a polyethylene terephthalate film was prepared; the surface of the polyethylene terephthalate film had been coated with a silicone releasable layer. An acrylic ester-based adhesive was coated on the polyethylene terephthalate film by bar-coating method so that an adhesive agent layer having a thickness of 20 μm was formed. Thereafter, the adhesive agent layer was laminated on the recording layer. An intermediate layer (adhesive agent layer) was formed by removing the releasable sheet.

(4) Formation of Cover Layer

A polycarbonate film (Panlite® film D-67 manufactured by TEIJIN CHEMICALS LTD.) having a thickness of 67 μm was laminated on the intermediate layer (adhesive agent layer) to form a cover layer.

In Comparative Examples 1-4, the intermediate layers (recording layer support layer and adhesive agent layer) and the cover layer were formed by the same methods as those of Example 1, and therefore description will be given only to the formation of the recording layer.

Comparative Example 1

The above-described compound C-1 was dissolved in propyleneglycol monomethylether acetate such that the solid content concentration thereof was adjusted to 13 mass %, to thereby prepare a coating liquid. After that, the coating liquid was applied onto the intermediate layer (recording layer support layer) by spin coating to form a recording layer having a thickness of 1 μm.

Comparative Example 2

The above-described compound P-1 (one-photon absorption dye) and polybenzylmethacrylate (manufactured by Sigma-Aldrich Co. LLC., Mw: approx. 70000) with the mass ratio of 22:78 were dissolved in methyl ethyl ketone, so that a coating liquid with a solid content concentration of 10 mass % was prepared. After that, the coating liquid was applied onto the intermediate layer (recording layer support layer) by spin coating to form a recording layer having a thickness of 1 μm.

Comparative Example 3

The above-described compound D-1 was dissolved in methyl ethyl ketone such that the solid content concentration thereof was adjusted to 10 mass %, to thereby prepare a coating liquid. After that, the coating liquid was applied onto the intermediate layer (recording layer support layer) by spin coating to form a recording layer having a thickness of 1 μm.

Comparative Example 4

The above-described compound H (one-photon absorption dye) and polyacenaphthylene (manufactured by Sigma-Aldrich Co. LLC., Mw: 5000-10000) with the mass ratio of 4:96 were dissolved in cyclohexane, so that a coating liquid with a solid content concentration of 11 mass % was prepared. After that, the coating liquid was applied onto the intermediate layer (recording layer support layer) by spin coating to form a recording layer having a thickness of 0.5 μm.

<Evaluation of Characteristics>

(1) Evaluation on Absorptance of Recording Layer and Absorption Maximum

The coating liquid, which was prepared in the process of the formation of the recording layer as described above and in which the material for the recording layer was dissolved in the solvent, was applied onto a quartz glass by spin coating to make a layer having a predetermined thickness. A sample in which the recording layer only was formed was prepared for each of Example 1 and Comparative Examples 1-4. It is to be noted that the thickness of the recording layer was 0.5 μm in Example 1 and Comparative Example 4 and 1 μm in Comparative Examples 1-3. Thereafter, the absorbance of each sample at the wavelengths from 250 nm to 800 nm was measured using a spectrophotometer (UV3100-PC manufactured by Shimadzu Corporation) to obtain the absorption spectrum. After that, the absorbance and the absorption maximum wavelength at the wavelength of 405 nm were read from the obtained absorption spectrum. Baseline was corrected by the measurement value of the quartz glass alone.

The light absorptance (%) was calculated by the following formula using the obtained absorbance at the wavelength of 405 nm.

$$\text{Light absorptance} = (1 - 10^{-(Absorbance)}) \times 100$$

As a result, the light absorptance of 8% was obtained in Example 1 and Comparative Examples 1, 2 and 4, and the light absorptance of 0% was obtained in Comparative Example 3. Further, it was confirmed that the absorption maximum wavelength was 373 nm in Example 1, 347 nm in Comparative Example 1, 347 nm in Comparative Example 2, 303 nm in Comparative Example 3, and 376 nm in Comparative Example 4.

(2) Evaluation on Recording Property

[Recording/Reading Evaluation Apparatus]

Recording and reading of information in the optical information recording media in Example 1 and Comparative Examples 1-4 were performed using a system equivalent to an ordinal BD (Blu-ray® Disc) pick-up optical system, and ODU-1000 (manufactured by Pulstec Industrial Co., Ltd.) was used as a control unit of an evaluation system comprising a spindle motor, a recording/reading laser, a light-sensitive element, and other parts. A semiconductor laser with a wavelength of 405 nm was used as a laser light source, and an objective lens with a numerical aperture (NA) of 0.85 was used as an objective lens, and the reflected beam reflected from the recording layer was monitored to obtain a readout signal. Part of the reflected beam was introduced into the focus control light-sensitive element, and the position of the objective lens was controlled to perform a focus control.

Using the above recording/reading evaluation apparatus, the optical information recording media in Example 1 and Comparative Examples 1-4 were subjected to recording by the following recording conditions, and thereafter the read-out signals were obtained by the following reading conditions to evaluate CNR (Carrier to Noise Ratio). The results were shown in the table of FIG. 5. In FIG. 5, PAcN represents polyacenaphthylene, PBzMA represents polybenzylmethacrylate, and PMMA represents polymethyl methacrylate.

Recording Conditions

Linear velocity: 2 m/s

Peak power of recording beam: 30 mW

Pulse duration: 30 ns

Pulse (repetition) frequency: 1 MHz

Read-Out Conditions

Linear velocity: 2 m/s

Peak power of reading beam: 1 mw

As shown in FIG. 5, in Example 1 and Comparative Examples 1, 2 and 4 in which the one-photon absorption dye was contained, CNR not smaller than 35 dB was obtained which showed that both of the recording sensitivity and the intensity of the readout signal were sufficiently high. This revealed that information was recordable (i.e., recording property was good) even by the recording beam having a peak power as small as 30 mW. On the other hand, in Comparative Example 3 in which the two-photon absorption dye was contained, CNR was 0 db. This revealed that information was not recorded (i.e., recording property was not good) by the recording beam having a peak power of 30 mW.

As described above, it was revealed that the recording material and the optical information recording medium according to the present invention (Example 1) in which the one-photon absorption dye was contained was recordable by a laser beam having a small peak power.

(3) Evaluation of Long-Term Stability (Stability of Intensity of Beam Reflected at Interface)

For each of the optical information recording media according to Example 1 and Comparative Examples 1-4, the intensity of the reflected beam coming from the interface between the recording layer and the intermediate layer (adhesive agent layer) was measured. Thereafter, these optical information recording media were stored under conditions of 80° C. and 85% RH for 100 hours, and the intensity of the reflected beam coming from the interface between the recording layer and the intermediate layer (adhesive agent layer) was measured. The measurement of the reflected beam intensity was made using a multilayer film thickness measuring device SI-TS10 (manufactured by Keyence Corporation). The results were shown in the table of FIG. 5.

As shown in FIG. 5, in Example 1 and Comparative Examples 1 and 3 which use a material in which a dye was bonded to a polymer binder, the intensity of the reflected beam after 100-hour storage was as high as 90% or more of the intensity of the reflected beam before storage. In other words, it was confirmed in Example 1 and Comparative Examples 1 and 3 that the rate of change in the intensity of the reflected beam before and after the storage was less than 10% and a change in the intensity of the reflected beam was small (i.e., the stability of the intensity of the reflected beam reflected at the interface was good). This means that even if the optical information recording medium which contains a compound in which a dye is bonded to a polymer binder is stored under conditions of high temperature and high humidity, the dye in the recording layer hardly spreads into the intermediate layer, so that excellent storage stability can be obtained.

On the other hand, in Comparative Examples 2 and 4 in which a material contains a dye dispersed in a polymer binder, the intensity of the reflected beam after 100-hour storage decreased to a level lower than 65% of the intensity of the reflected beam before storage. In other words, it was confirmed in Examples 2 and 4 that the rate of change in the intensity of the reflected beam before and after the storage was equal to or higher than 35% and a change in the intensity of the reflected beam was great (i.e., the stability of the intensity of the reflected beam reflected at the interface was not good). This means that if the optical information recording medium which contains a material in which a dye is dispersed in a polymer binder is stored under conditions of high temperature and high humidity, the dye in the recording layer easily spreads into the intermediate layer, so that the readout signal degrades significantly due to a significant decrease in the intensity of the reflected beam reflected at the interface.

As described above, it was revealed that a recording material according to the present invention containing a compound in which a dye is bonded to a polymer binder and an optical information recording medium according to the present invention (Example 1) containing the recording material had a high stability with respect to the intensity of the reflected beam reflected at the interface and excelled in long-term stability.

(4) Evaluation on Long-Term Stability (Stability of Recording Marks)

The intermediate layer (adhesive agent layer) was peeled off from each of the optical information recording media according to Example 1 and Comparative Examples 1-4, in which information had been recorded, so that the surface of the recording layer was exposed. The exposed surface of the recording layer was observed using an atomic force microscope (AFM) and by the following conditions. It was confirmed that the surface of each recording layer had protrusions (recording marks) formed at the recording spot and protruding toward the adhesive agent layer. The height of the recording mark(s) at the surface of each recording layers was measured using the AFM. Thereafter, these optical information recording media were stored under conditions of 80° C. and 85% RH for 100 hours, and the height of the recording mark(s) formed on the surface of each recording layer was measured using the AFM and by the same conditions as those of the measurement before storage. Based on the height of the recording mark(s) before storage and the height of the recording mark(s) after the storage, the rate of change in the height of the recording mark(s) after the storage was calculated. For example, if the height of the recording mark(s) before storage is 100 nm and the height of the recording mark(s) after the storage is 90 nm or 110 nm, then the rate of change becomes 10%. The obtained results were shown in the table of FIG. 5.

[Atomic Force Microscopy]

Device: Nano Search Microscope OLS-3500 (manufactured by Olympus Corporation)

Observation conditions: Dynamic mode, Scanning range of 5 μm, Scanning speed of 1 Hz Probe: High-aspect-ratio probe AR5-NCHR-20 (manufactured by NanoWorld AG)

As described above, information was not recorded in the optical information recording medium according to Comparative Example 3 by a laser beam having a small peak power. Therefore, information was recorded using a pulsed laser (wavelength of 405 nm, repetition frequency of 76 MHz, and pulse width of 2 ps) and by the following recording conditions.

Recording Conditions
Linear velocity: 1.4 m/s
Peak power of recording beam: 50 mW (Average Pw: 7.6 mW)
Pulse duration: 100 ns
Pulse (repetition) frequency: 4.7 MHz (5) Measurement of Glass Transition Temperature Measurement of glass transition temperature (Tg) was performed using a differential scanning calorimeter (DSC) Q100 (manufactured by TA Instruments Inc.). The coating liquid of the material for each of the recording layers according to Example 1 and Comparative Examples 1-4 was dropped in a measurement container, followed by heating of the measurement container for 1 hour at 200° C. to remove the solvent in the coating liquid, so that measurement samples were prepared respectively. Thereafter, the DSC measurement was performed for each measurement samples by the following methods and the following conditions.

The DSC measurement was carried out by a cycle of operations comprising heating (first time), cooling (first time) and heating (second time), and DSC curves were obtained during the first time of cooling and the second time of heating. The average value of the Tg from the DSC curve obtained during the first time of cooling and the Tg from the DSC curve obtained during the second time of heating was regarded as the Tg of the material for the recording layer. To obtain Tg from DSC curve, the Tg was read off from an inflection point of the DSC curve. The results were shown in the table of FIG. 5.

Measuring Conditions
Measuring range: −30° C. to 230° C.
Heating/cooling rate: 10° C./min As shown in FIG. 5, in Example 1 and Comparative Example 4 in which the glass transition temperature was 200° C. or higher, the rate of change in the height of the recording mark(s) before and after the storage was lower than 10% and the recording mark(s) underwent a slight change in shape (i.e., stability of the recording mark(s) was good). On the other hand, in Comparative Examples 1-3, the rate of change in the height of the recording mark(s) before and after the storage was equal to or higher than 30%; especially in Comparative Examples 1 and 2, the recording mark(s) was completely disappeared after the storage (rate of change: 100%). Accordingly, it was revealed that in Comparative Examples 1-3 in which the glass transition temperature was smaller than 200° C., the recording mark(s) underwent a significant change in shape (i.e., stability of the recording mark(s) was not good).

<Examples of Dye-Bonded Polymer Compound>

The above-described compound G (Example 1) is shown as dye-bonded polymer compound 1 in FIG. 6; the polymer binder is polyacenaphthylene made of monomer 1-1 having the above chemical structural formula, and the one-photon absorption dye is 1-aminobutadiene derivative (monomer 2-1 having the above chemical structural formula). The mass ratio (of polymer binder to one-photon absorption dye) of the compound G is 98:2. The glass transition temperature of the dye-bonded polymer compound 1 (compound G) is higher than 200° C.

FIG. 6 shows dye-bonded polymer compounds 2-20 as examples of the dye-bonded polymer compound according to the present invention in addition to the dye-bonded polymer compound 1.

The dye-bonded polymer compounds 2-4 can be synthesized in the same manner as the dye-bonded polymer compound 1 (Compound G) by appropriately adjusting the mass ratio of the monomer (acenaphthylene) constituting the polymer binder and the one-photon absorption dye (1-aminobutadiene derivative) when the above-described dye-bonded polymer compound 1 is synthesized. The glass transition temperatures of the dye-bonded polymer compounds 2-4 were measured in the same manner as described above; all the dye-bonded polymer compounds 2-4 had glass transition temperatures higher than 200° C.

The dye-bonded polymer compounds 5-20 can be synthesized in the same manner as the dye-bonded polymer compound 1 by replacing the monomer (monomer 1-1) constituting the polymer binder and the one-photon absorption dye (monomer 2-1) used for the synthesis of the above-described dye-bonded polymer compound 1 (Compound G) as needed with one selected from the monomers 1-1 to 1-5 having the above chemical structural formulae and one selected from the monomers 2-1 to 2-3 and then appropriately adjusting the mass ratio of the selected monomers. The glass transition temperatures of the dye-bonded polymer compounds 5-20 were measured in the same manner as described above; all the dye-bonded polymer compounds 5-20 had glass transition temperatures higher than 200° C.

What is claimed is:

1. An optical information recording medium comprising a recording layer and an intermediate layer adjacent to the recording layer, wherein:

the recording layer comprises a recording material comprising a dye-bonded polymer compound which contains a polymer compound to which a one-photon absorption dye is bonded, the glass transition temperature of the recording material is higher than 200° C., the recording layer is provided in a plurality of layers of the optical information recording medium, and the intermediate layer is provided between adjacent recording layers, each recording layer has a first interface and a second interface between the recording layer and two intermediate layers sandwiching the recording layer, at least one of the first and second interfaces is configured to have a protrusion formed by irradiation with a recording beam, the protrusion sticking out into an intermediate layer corresponding to the at least one of the first and second interfaces, and the one-photon absorption dye is selected from the group consisting of 1-aminobutadiene derivatives, benzotriazole derivatives and acridone derivatives, which are represented by the following chemical structural formulae:

Monomer 2-1

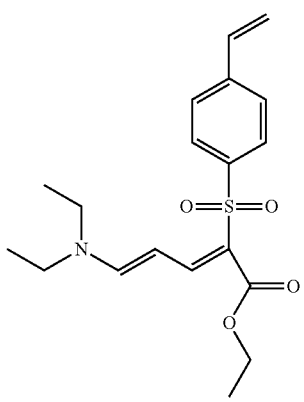

Monomer 2-2

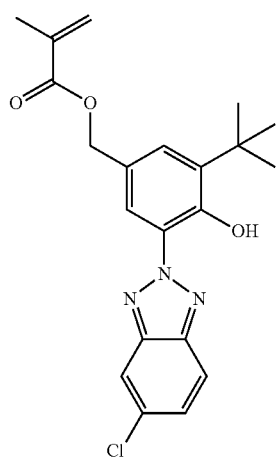

Monomer 2-3

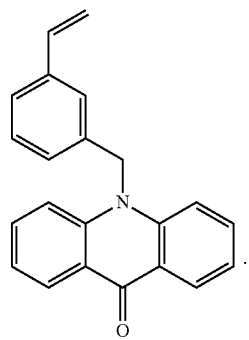

2. The optical information recording medium according to claim 1, wherein the main chain of the polymer compound is selected from the group consisting of polyacenaphthylene, poly(N-vinylcarbazole), poly(N-vinylphthalimide), polyindene, and poly(N-trichlorophenyl maleimide).

3. The optical information recording medium according to claim 1, wherein the dye-bonded polymer compound has an absorption maximum at a wavelength in the range from 300 nm to 400 nm and does not have absorption of light in a visible spectrum range of wavelengths equal to or greater than 450 nm.

4. The optical information recording medium according to claim 1, wherein the thickness of the recording layer is in the range of 50 nm to 5 μm.

5. An optical information recording medium comprising a recording layer and an intermediate layer adjacent to the recording layer, wherein:
the recording layer comprises a recording material comprising a dye-bonded polymer compound which contains a polymer compound to which a one-photon absorption dye is bonded, the glass transition temperature of the recording material is higher than 200° C., the recording layer is provided in a plurality of layers of the optical information recording medium, and the intermediate layer is provided between adjacent recording layers, each recording layer has a first interface and a second interface between the recording layer and two intermediate layers sandwiching the recording layer, at least one of the first and second interfaces is configured to have a protrusion formed by irradiation with a recording beam, the protrusion sticking out into an intermediate layer corresponding to the at least one of the first and second interfaces, the protrusion is formed in one of the first interface and the second interface by irradiation with the recording beam, and the protrusion is not formed in the other one of the first interface and the second interface, the difference between refractive indices of the intermediate layer and the recording layer is greater at the interface in which the protrusions is formed than at the interface in which the protrusion is not formed, and the one-photon absorption dye is selected from the group consisting of 1-aminobutadiene derivatives, benzotriazole derivatives and acridone derivatives, which are represented by the following chemical structural formulae:

Monomer 2-1

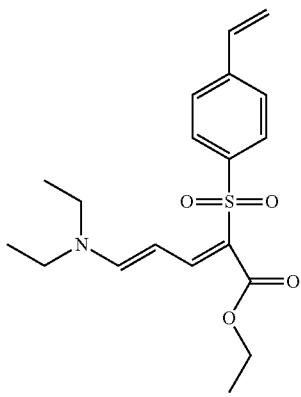

Monomer 2-2

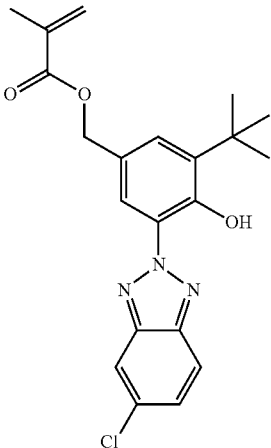

-continued

Monomer 2-3

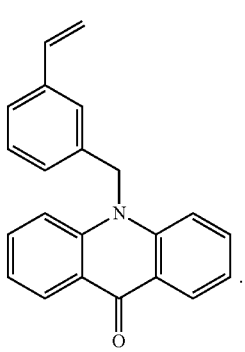

6. The optical information recording medium according to claim 5, wherein the difference between the refractive index of the intermediate layer forming the interface in which the protrusion is not formed and the refractive index of the recording layer is equal to or smaller than 0.05.

7. The optical information recording medium according to claim 5, wherein the main chain of the polymer compound is selected from the group consisting of polyacenaphthylene, poly(N-vinylcarbazole), poly(N-vinylphthalimide), polyindene, and poly(N-trichlorophenyl maleimide).

8. The optical information recording medium according to claim 5, wherein the dye-bonded polymer compound has an absorption maximum at a wavelength in the range from 300 nm to 400 nm and does not have absorption of light in a visible spectrum range of wavelengths equal to or greater than 450 nm.

9. The optical information recording medium according to claim 5, wherein the thickness of the recording layer is in the range of 50 nm to 5 μm.

* * * * *